Oct. 24, 1961   W. L. MURPHY ET AL   3,005,246
METHOD OF PRODUCING HIGH-QUALITY INGOTS OF REACTIVE METALS
Filed Dec. 24, 1958
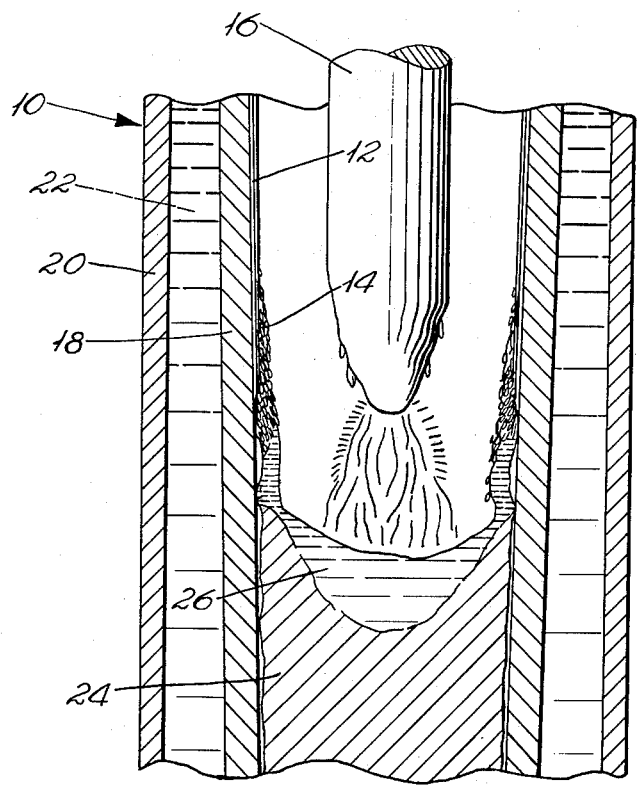
INVENTORS
WILLIAM L. MURPHY
MAX L. POCHON
BY Thomas J. O'Brien
ATTORNEY

United States Patent Office 3,005,246
Patented Oct. 24, 1961

3,005,246
METHOD OF PRODUCING HIGH-QUALITY
INGOTS OF REACTIVE METALS
William L. Murphy and Max L. Pochon, Niagara Falls, N.Y., assignors to Union Carbide Corporation, a corporation of New York
Filed Dec. 24, 1958, Ser. No. 782,793
7 Claims. (Cl. 22—216.5)

This invention relates to an improved mold and process for producing high-quality ingots of arc melted reactive metal and, more particularly, to an improved mold and process for producing high-quality ingots of tantalum, tungsten, molybdenum, columbium, titanium, vanadium, and their alloys.

Arc melting and casting of reactive metals present a particularly difficult problem in that these materials when molten have a strong affinity for oxygen, hydrogen, nitrogen, and carbon. If these metals are melted in contact with commonly-known refractory substances or in contact with air, the metal will generally contain enough of these impurities to embrittle the metal and impair its utility. For this reason, normal melting and casting processes used in melting and casting reactive metals and their alloys have been found to be wholly inadequate for the preparation of the high-quality ingots of these metals. Attempts to melt and cast such materials by conventional techniques result in severe contamination, loss of ductility and unacceptable quality. A partial solution to this problem has been provided by the discovery that these reactive metals and their alloys can be arc melted and cast in water-cooled metal mold. The problem of contamination by air was solved by melting under the protection of an inert atmosphere, such as argon or helium, or melting in a vacuum.

In arc melting processes, the heat for melting is supplied by an electric arc using either a nonconsumable or a consumable electrode. One of the most troublesome problems encountered in the consumable electrode arc melting process is a spattering of molten metal which freezes and becomes encrusted on the side walls of the water-cooled mold. The encrusting of metal on the side walls of the mold invariably results in the production of an ingot of such poor surface quality that subsequent conditioning of the ingot is necessary before it is suitable for fabrication. This conditioning of ingots has resulted in a metal loss of as much as 50 percent of the total ingot weight.

Many attempts have been made to improve the arc melting consumable electrode process in order to reduce or eliminate the encrusted side wall deposits. One such method is to increase the amount of heat input over and above that necessary for the arc melting, so as to attempt to melt these side wall deposits. However, such an approach greatly increases the risk of melting the water-cooled mold which carries with it an added risk of explosion hazard if the molten metal, due to the increase in heat input, burns through the mold wall and comes into contact with water. For this reason, this method is generally unacceptable.

Another method of combating this problem is to employ a sleeve of machined graphite between the water-cooled mold and the ingot surface. The graphite, which is not wetted by certain of these metals, provides an effective deterrent to extraction of heat and results in complete melting of all encrusted side wall deposits as the ingot is formed. However, the difficulty associated with this approach as a solution to the problem is that the contacting of the molten metal with a graphite sleeve, even for a brief period of time, results in undesirable carbon contamination which embrittles the ingot.

Accordingly, it is an object of the present invention to provide an improved ingot mold and process for producing high-quality, sound ingots of arc melted reactive metals, whereby improved surface quality is achieved.

Another object of the present invention is to provide an improved ingot mold and process for producing high-quality ingots of arc melted reactive metals in an manner such that the resulting ingot shows a marked improvement in grain refinement.

Other objects and advantages of the present invention will be apparent from the following description and appended claims.

In accordance with this invention, in the process for producing high-quality ingots of at least one metal selected from the group consisting of tantalum, tungsten, molybdenum, columbium, titanium, vanadium, and alloys thereof, wherein the metal is arc melted into a water-cooled metal mold, the improvement which comprises providing on the inner walls of the water-cooled metal mold a liner consisting of at least one of the metals being melted therein. The liner has a thickness such that, as the molten metal rises in the water-cooled metal mold, the heat of the molten metal and the heat of radiation cause the metal spatter adhering to the liner and the liner itself to melt, whereby the metal spatter and the liner become an integral part of the ingot produced.

An embodiment of a mold suitable for use in practicing this invention is shown in the single figure of the drawing which is a vertical cross-section view of a consumable electrode arc melting apparatus.

Referring specifically to the drawing, an electrode 16 is shown in a water-cooled mold 10 having an outer jacket 20 and an inner copper jacket 18. The cooling water 22 is passed between outer jacket 20 and inner copper jacket 18. Covering and adjacent with inner side walls of copper jacket 18 is a liner 12. Metal spatter 14 is shown adhering to liner 12 above the formed portion 24 of the ingot. Molten metal is shown at 26.

In practicing the invention, the metal to be melted, usually in the form of dendrites, sponge powder, chips, or scraps, is compacted to form electrode 16 which is fed vertically downward into the water-cooled mold 10. If, for example, electrode 16 is a titanium electrode, the liner 12 covering the inner wall of copper jacket 18 is also made of titanium. According to known practices, an arc is struck between electrode 16 and a bed of metal of the same composition as the electrode which is placed in the bottom (not shown) of the water-cooled mold. The entire melting operation is conducted either under the protection of an inert atmosphere or in a vacuum. During the melting operation, metal droplets from the electrode 16 and/or spatter from the molten pool 26 form a metal spatter 14 on the liner 12 which freezes and becomes encrusted thereon. As the melt rises in water-cooled mold 10, the heat of the molten metal 26 and the heat of radiation from the arc combine to first melt metal spatter 14 and finally liner 12. The metal spatter and liner become an integral part of the ingot.

While this invention is applicable primarily to arc melting with a consumable electrode, the advantage of this invention may also be realized in a nonconsumable arc melting process where spattering of the metal also occurs.

The liner employed in this invention may be cut from a sheet material suitable for liners and brought to the approximate shape of the mold cavity by suitable forming operation. In describing the liner of this invention, a cylindrical shaped mold is discussed by way of example; however, it is to be understood that suitably shaped liners can be made for molds of any desired geometry.

It has been found that, in order to obtain improved grain quality, surface condition and melt rate, the liner must have a thickness such that it is thick enough not to melt prematurely and fall into the molten pool but thin enough to completely melt and become an integral part of the ingot. More specifically, it has been found that liners which are too thin will melt prematurely and fall into the advancing melt; this necessarily results in the adherence of metal spatter to the mold wall which destroys any beneficial effects previously obtained. If, on the other hand, the liners are too thick, incomplete fusion of the liner occurs, metal spatter is unmelted, or subcutaneous cavities develop between the advancing melt and the liner. This would result in poor surface quality and would frustrate the purpose of this invention.

In addition, the liner employed has a composition consisting of at least one of the metals being melted therein. For example, in arc melting and casting titanium, a liner of pure titanium metal is used. However, in the case of a titanium-base alloy, a pure titanium metal liner or a liner of the alloy composition being melted can be used. For other reactive metals and base alloys, this is also applicable. The choice of liner composition is dependent upon the purity or homogeneity required in the ingot.

The liner of this invention, disposed on the inner side walls of the water-cooled mold acts as a heat transfer control means. With water-cooling of the mold and a proper liner thickness, the liner does not prematurely melt due to the heat of radiation from the arc and/or the heat from the molten pool of metal. However, for some short distance above the molten pool, the heat of radiation from the arc causes metal spatter encrusted in the liner to begin to melt and build up a layer of molten material which runs down into the molten pool. Without wishing to be bound by any theory, it is believed the liner, at this point, radially shrinks from the mold wall, thereby destroying the heat transfer means and enhancing the melting process.

This results in a complete melting of the metal spatter encrusted on the liner and a running of the melted spatter into the molten pool, and fusion of the liner at the point of contact of the liner and molten pool. The metal spatter and liner thus become an integral part of the ingot. At this point the molten metal, no longer confined by the liner, comes in contact with the water-cooled mold and solidifies to form a solid case. The resulting side wall is smooth and free from metal spatter.

If the liner does not have the critical thickness, the above phenomena will not occur and the advantage derived through the use of the liner of this invention will not be obtained. It has been found that for use in a cylindrical water-cooled metal mold, the liner should preferably have a wall thickness ranging from about 0.002 to 0.007X, where X is the inside diameter of the mold. In certain cases, however, as for instance when larger diameter ingots are being produced, greater variations in liner thickness are permissible. Such a range of thickness would be on the order of 0.001 to 0.010X, where X is the inside diameter of the mold. The criticality attached to the liner thickness may be better illustrated by reference to Table I below which sets forth data for optimum liner thickness for various metals melted in cylindrical molds of varying diameter.

TABLE I

| Metal | Ingot Diameter, Inches | Optimum Thickness, Inches |
|---|---|---|
| Ti | 2 | 0.007 to 0.041 |
| Ti | 3½ | 0.012 to 0.020 |
| Ti | 6 | 0.025 to 0.040 |
| Ta | 2 | 0.007 to 0.012 |
| Ta | 3½ | 0.007 to 0.014 |
| Ta | 4 | 0.007 to 0.014 |
| Cb | 2 | 0.006 to 0.014 |
| V | 2 | 0.006 to 0.014 |

It has been found that, for noncylindrical shaped molds, liner thickness should be about equal to about 0.002 to 0.008 times a value of diameter equivalent to a cylindrical cross-sectional area equal to the noncylindrical cross-sectional area involved.

More specifically, such thickness may be determined by transforming the resulting relationship:

$$\frac{\pi D^2_{equivalent}}{4} = \text{Area}$$

$$D_{equiv} = \sqrt{\frac{4 \text{ Area}}{\pi}} = \sqrt{1.12 \text{ Area}}$$

Therefore, the thickness may be determined as:

$T = 0.002$ to $0.007\ D_{equiv} = 0.002$ to $0.007 \times 1.12$ Area
$T = 0.002$ to $0.008\ \sqrt{\text{Area}}$ The use of the liner in the arc melting and casting of reactive metals also increases the melting rate. This effect is believed to be due to the concentration of heat caused by the insulation effect of the liner and to reflection of heat back into the melt. This may be more clearly illustrated by reference to Table II below which sets forth data showing the increase in melt rate when a liner is employed:

TABLE II

| Metal | Ingot Diameter, Inches | Condition | Melt Rate, Lb./Minute |
|---|---|---|---|
| Ta | 2 | No liner | 1.28 |
| Ta | 2 | do | 1.40 |
| Ta | 2 | Liner | 2.7 |
| Ta | 2 | do | 3.0 |
| Ta | 2 | do | 2.9 |
| Ta | 2 | do | 3.3 |
| Ta | 3½ | No liner | 2.8 |
| Ta | 3½ | Liner | 4.1 |

*Example I*

A one-inch square cross section tantalum metal electrode was melted in a consumable electrode arc-melting furnace of conventional design. The electrode was melted into a two-inch diameter cylindrical water-cooled copper mold, both with and without the use of a tantalum liner. A 0.010-inch thick sheet liner of tantalum on the inner side walls of the cylindrical water-cooled copper mold provided optimum conditions for good surface quality. For the 3½-inch tantalum ingots, a 1½-inch square cross section tantalum electrode was melted into a 3½-inch cylindrical water-cooled copper mold. An 0.010-inch thick tantalum liner was employed. The results obtained through the use of the liner are set forth in Table III below. The metal recovered includes losses from machining the top, bottom, and sides of the ingot.

TABLE III

| Metal | Liner | Ingot Diameter, Inches | | Metal Recovery, Weight Percent |
|---|---|---|---|---|
| | | As Melted | As Dressed | |
| Ta | None | 2 | 1.562 | 50.3 |
| Ta | None | 2 | 1.462 | 52.3 |
| Ta | None | 2 | 1.443 | 56.1 |
| Ta | Yes | 2 | | 91.89 |
| Ta | Yes | 2 | | 92.94 |
| Ta | Yes | 2 | | 91.46 |
| Ta | None | 3½ | | 55.0 |
| Ta | Yes | 3½ | | 85.0 |

As may be noted from Table III, dressing of ingots melted without a liner by machining to produce a sound billet for fabrication resulted in a metal loss of 50 to 56 percent of total ingot weight, while the ingots produced in a liner mold of the invention had a total scrap loss that amounted to less than about 15 percent of the ingot weight.

*Example II*

In another example, a one-inch square cross section titanium metal electrode was arc melted in high vacuum in a consumable electrode arc melting furnace of conventional design. The electrode was melted into 2-inch and 3½-inch diameter cylindrical water-cooled copper molds with and without the use of titanium liners. An 0.016-inch thick liner of titanium on the inner side walls of the 2-inch water-cooled copper mold and an 0.020-inch thick liner of titanium on the inner side walls of the 3½-inch water-cooled copper mold provided conditions that resulted in good surface quality. The results obtained through the use of the liner are set forth in Table IV below. The metal recovery includes calculated losses from machining the top, bottom, and sides of the ingot.

TABLE IV

| Metal | Liner | Ingot Diameter, Inches | | Metal Recovery, Weight Percent |
|---|---|---|---|---|
| | | As Melted | As Dressed | |
| Ti | Yes | 3½ | 3½ | 96.5 |
| Ti | Yes | 3½ | 3½ | 96.5 |
| Ti | None | 3½ | 2.75 | 52.55 |
| Ti | None | 3½ | 2.625 | 51.35 |
| Ti | None | 3½ | 2.75 | 49.85 |
| Ti | Yes | 2 | 1.9275 | 85.82 |
| Ti | None | 2 | 1.75 | 59.71 |

In addition, a two-inch square cross section of a titanium metal electrode was arc melted in vacuum by the consumable electrode process in a six-inch diameter cylindrical water-cooled copper mold and a one-inch square cross section of a columbium metal electrode and vanadium metal electrode, respectively, were separately arc melted in a high vacuum in two-inch diameter cylindrical water-cooled copper molds. The ingots produced had exceptionally good surface quality and the need for scalping of the ingot surface was virtually eliminated, while those ingots produced without the use of liners required a great deal of machining to obtain acceptable surface qualities.

The high-quality ingots produced by this invention are those ingots having good surface quality, a refined grain structure, and a purity of at least about 99.9 percent.

What is claimed is:

1. A process for producing ingots of a metal selected from the group consisting of tantalum, tungsten, molybdenum, columbium, titanium, vanadium and base alloys thereof from a consumable electrode in a surrounding liquid-cooled metal mold, said process comprising inserting a consumable mold liner, formed of the metal to be cast, into the liquid-cooled mold with substantially the entire opposing surfaces of the inserted liner and said mold being in direct heat transfer contact; and arc melting said consumable electrode in the thus lined liquid-cooled mold, said consumable liner having a thickness such that, as the molten metal derived from the consumable electrode rises in the mold, the heat of said molten metal and the heat of radiation from the arc cause the portion of the liner adjacent the molten metal and the spatter adhering to the liner to melt whereby said metal spatter and said liner become an integral part of the final ingot.

2. A process for producing ingots of a metal selected from the group consisting of tantalum, tungsten, molybdenum, columbium, titanium, vanadium and base alloys thereof from a consumable electrode in a surrounding water-cooled metal mold, said process comprising inserting a consumable mold liner, formed of the metal to be cast, into the water-cooled mold with substantially the entire opposing surfaces of the inserted liner and said mold being in direct heat transfer contact; and arc melting said electrode in the thus lined water-cooled mold, said consumable liner having a thickness in inches of between about $0.002\sqrt{A}$, and $0.008\sqrt{A}$, where A is the cross-sectional area in square inches of said water-cooled metal mold.

3. A process for producing ingots of a metal selected from the group consisting of tantalum, tungsten, molybdenum, columbium, titanium, vanadium and base alloys thereof from a consumable electrode in a surrounding cylindrical water-cooled metal mold, said process comprising inserting a consumable mold liner, formed of the metal to be cast, into the cylindrical water-cooled mold with substantially the entire opposing surfaces of the inserted liner and said mold being in direct heat transfer contact; and arc melting said electrode in the thus lined water-cooled mold, said consumable liner having a thickness in inches of between about 0.002X and 0.007X, where X is the inside diameter of said cylindrical water-cooled metal mold in inches.

4. A process for producing ingots of columbium metal from a consumable electrode in a surrounding cylindrical water-cooled copper mold which comprises inserting a consumable mold liner formed of columbium into the water-cooled copper mold with substantially the entire opposing surfaces of the inserted liner and said mold being in direct heat transfer contact; and arc melting said consumable electrode in the thus lined water-cooled copper mold, said consumable liner having a thickness between about 0.006 to 0.014 inch where the diameter of the final ingot is about 2 inches.

5. A process for producing ingots of tantalum metal from a consumable electrode in a surrounding cylindrical water-cooled copper mold which comprises inserting a consumable mold liner formed of tantalum into the water-cooled copper mold with substantially the entire opposing surfaces of the inserted liner and said mold being in direct heat transfer contact; and arc melting said consumable electrode in the thus lined water-cooled copper mold, said consumable liner having a thickness between about 0.007 and 0.012 inch where the diameter of the final ingot is about 2 inches.

6. A process for producing ingots of tantalum metal from a consumable electrode in a surrounding cylindrical water-cooled copper mold which comprises inserting a consumable mold liner formed of tantalum into the water-cooled copper mold with substantially the entire opposing surfaces of the inserted liner and said mold being in direct heat transfer contact; and arc melting said consumable electrode in the thus lined water-cooled copper mold, said consumable liner having a thickness between about 0.007 and 0.014 inch where the diameter of the final ingot is about 3½ inches.

7. A process for producing ingots of tantalum metal from a consumable electrode in a surrounding cylindrical water-cooled copper mold which comprises inserting a consumable mold liner formed of tantalum into the water-cooled copper mold with substantially the entire opposing surfaces of the inserted liner and said mold being in direct heat transfer contact; and arc melting said consumable electrode in the thus lined water-cooled copper mold, said consumable liner having a thickness between about 0.007 and 0.014 inch where the diameter of the final ingot is about 4 inches.

References Cited in the file of this patent

UNITED STATES PATENTS

| 2,205,854 | Kroll | June 25, 1940 |
| 2,273,543 | Terrill | Feb. 17, 1942 |
| 2,527,545 | Goss | Oct. 31, 1950 |
| 2,548,897 | Kroll | Apr. 17, 1951 |
| 2,734,244 | Herres | Feb. 14, 1956 |
| 2,835,940 | Wieland | May 27, 1958 |
| 2,858,586 | Brennan | Nov. 4, 1958 |

FOREIGN PATENTS

| 736,852 | Great Britain | Sept. 14, 1955 |